United States Patent
Bala et al.

(10) Patent No.: US 9,489,582 B2
(45) Date of Patent: Nov. 8, 2016

(54) VIDEO ANOMALY DETECTION BASED UPON A SPARSITY MODEL

(71) Applicants: Xerox Corporation, Norwalk, CT (US); The Penn State Research Foundation, University Park, PA (US)

(72) Inventors: Raja Bala, Pittsford, NY (US); Aaron M. Burry, Ontario, NY (US); Vishal Monga, State College, PA (US); Xuan Mo, Redmond, WA (US)

(73) Assignees: Xerox Corporation, Norwalk, CT (US); The Penn State Research Foundation, University Park, PA (US)

( * ) Notice: Subject to any disclaimer, the term of this patent is extended or adjusted under 35 U.S.C. 154(b) by 90 days.

(21) Appl. No.: 14/534,790

(22) Filed: Nov. 6, 2014

(65) Prior Publication Data

US 2015/0213323 A1   Jul. 30, 2015

Related U.S. Application Data

(60) Provisional application No. 61/931,730, filed on Jan. 27, 2014.

(51) Int. Cl.
G06K 9/00        (2006.01)

(52) U.S. Cl.
CPC ....... G06K 9/00785 (2013.01); G06K 9/00335 (2013.01)

(58) Field of Classification Search
None
See application file for complete search history.

(56) References Cited

U.S. PATENT DOCUMENTS

| | | |
|---|---|---|
| 5,943,677 A | 8/1999 | Hicks |
| 8,229,199 B2 | 7/2012 | Chen et al. |
| 8,463,745 B2 | 6/2013 | Grosset et al. |
| 2013/0006725 A1 | 1/2013 | Simanek et al. |
| 2013/0191189 A1 | 7/2013 | Aparicio et al. |
| 2013/0286208 A1* | 10/2013 | Bala ............. G06K 9/00771 348/149 |
| 2014/0037215 A1 | 2/2014 | Kumar et al. |
| 2014/0037216 A1 | 2/2014 | Kumar et al. |
| 2014/0037269 A1 | 2/2014 | Kumar et al. |
| 2014/0111372 A1 | 4/2014 | Wu |

(Continued)

OTHER PUBLICATIONS

Cong et al. "Sparse Reconstruction Cost for Abnormal Event Detection"; Computer Vision and Pattern Recognition (CVPR), 2011 IEEE Conference; Jun. 25, 2011; pp. 3449-3456 (referred to as Cong).*

(Continued)

*Primary Examiner* — Wesley Tucker
(74) *Attorney, Agent, or Firm* — Kermit D. Lopez; Luis M. Ortiz; Ortiz & Lopez, PLLC

(57) ABSTRACT

Methods, systems, and processor-readable media for video anomaly detection based upon a sparsity model. A video input can be received and two or more diverse descriptors of an event can be computed from the video input. The descriptors can be combined to form an event matrix. A sparse reconstruction of the event matrix can be performed with respect to an over complete dictionary of training events represented by the diverse descriptors. A step can then be performed to determine if the event is anomalous by computing an outlier rejection measure on the sparse reconstruction.

20 Claims, 8 Drawing Sheets

(56) References Cited

U.S. PATENT DOCUMENTS

| | | | |
|---|---|---|---|
| 2014/0176708 A1* | 6/2014 | Ramakrishnan ... | G06K 9/00771 348/143 |
| 2014/0177384 A1 | 6/2014 | Boufounos | |
| 2014/0232862 A1* | 8/2014 | Bala .................... | G06K 9/6256 348/143 |
| 2014/0270353 A1* | 9/2014 | Bala .................. | G06K 9/00771 382/103 |
| 2015/0110357 A1* | 4/2015 | Bala .................... | G06K 9/6249 382/104 |

OTHER PUBLICATIONS

Chuang, C.-H. et al., "Carried Object Detection Using Ratio Histogram and its Application to Suspicious Event Analysis," IEEE Transactions on Circuits and Systems for Video Technology (2009) 19(6):911-916.

Li, C. et al., "Abnormal Behavior Detection via Sparse Reconstruction Analysis of Trajectory," 2011 Sixth International Conference on Image and Graphics Aug. 2011, pp. 807-810.

Mishali, M. et al., "Blind Multiband Signal Reconstruction: Compressed Sensing for Analog Signals," IEEE Transactions on Signal Processing (2009) 57(3):993-1009.

Mo, X. et al., "Adaptive Sparse Representations for Video Anomaly Detection," IEEE Transactions on Circuits and Systems for Video Technology (2014) 24(4):631-645.

Piciarelli, C. et al., "Trajectory-Based Anomalous Event Detection," IEEE Transactions on Circuits and Systems for Video Technology (2008) 18(11):1544-1554.

Pruteanu-Malinici, I. et al., "Infinite Hidden Markov Models for Unusual-Event Detection Video," IEEE Transactions on Image Processing (2008) 17(5):811-822.

Saligrama, V. et al., "Video Anomaly Identification," IEEE Signal Processing (2010) 27(5):18-33.

Simon, C. et al., "Visual event recognition using decision trees," Multimed. Tools Appl. (2010) 50:95-121.

Tropp, J. A. et al., "Algorithms for simultaneous sparse approximation. Part I: Greedy pursuit," Signal Processing (2006) 86:572-588.

Vaswani, N. et al., "Shape Activity': A Continuous-State HMM for Moving/Deforming Shapes with Application to Abnormal Activity Detection," IEEE Transactions on Image Processing (2005) 14(10):1603-1616.

Wang, X. et al., "Unsupervised Activity Perception in Crowded and Complicated Scenes Using Hierarchical Bayesian Models," IEEE Transactions on Pattern Analysis and Machine Intelligence (2009) 31(3):539-555.

Wright, J. et al., "Robust Face Recognition via Sparse Representation," IEEE Transactions on Pattern Analysis and Machine Intelligence (2009) 31(2):210-227.

Zhang, H. at al, "Joint-Structure-Sparsity-Based Classification for Multiple-Measurement Transient Acoustic Signals," IEEE Transactions on Systems, Man, and Cybernetics—Part B: Cybernetics (2012) 42(6):1586-1598.

Zhao, B. et al., "Online Detection of Unusual Events in Videos via Dynamic Sparse Coding," 2011 IEEE Conference on Computer Vision and Pattern Recognition (CVPR), pp. 3313-3320.

* cited by examiner

VIDEO ANOMALY DETECTION BASED UPON A SPARSITY MODEL

CROSS-REFERENCE TO PROVISIONAL APPLICATION

This application claims priority under 35 U.S.C. 119(e) to U.S. Provisional Patent Application Ser. No. 61/931,730, entitled "Simultaneous Structured Sparsity Model for Exploiting Feature and Observation Diversity in Video Anomaly Detection," which was filed on Jan. 27, 2014, the disclosure of which is incorporated herein by reference in its entirety.

FIELD OF THE INVENTION

Embodiments are generally related to the management of traffic systems. Embodiments are also related to the field of video-based surveillance. Embodiments are additionally related to the detection of multi-object anomalies at traffic intersections for use in managing traffic.

BACKGROUND

With the increased demand for security and safety, video-based surveillance systems are being employed in a variety of rural and urban locations. A vast amount of video footage, for example, can be collected and analyzed for traffic violations, accidents, crime, terrorism, vandalism, and other suspicious activities. Because manual analysis of such large volumes of data is prohibitively costly, a pressing need exists for developing effective software tools that can aid in the automatic or semi-automatic interpretation and analysis of video data for surveillance, law enforcement, and traffic control and management.

Video-based anomaly detection refers to the problem of identifying patterns in data that do not conform to expected behavior, and which may warrant special attention or action. The detection of anomalies in the transportation domain can include, for example, traffic violations, unsafe driver/pedestrian behavior, accidents, etc.

FIGS. 1-2 illustrate pictorial views of exemplary transportation related anomalies captured from, for example, video-monitoring cameras. In the scenario depicted in FIG. 1, unattended baggage 100 is shown and identified by a circle. In the example shown in FIG. 2, a vehicle is depicted approaching a pedestrian 130. Both the vehicle and pedestrian 130 are shown surrounded by a circle.

A number of anomalies can be generated by a typical trajectory/behavior of a single object and collective anomalies can be caused by joint observation of the objects. For example, in the area of transportation, accidents at traffic intersections are indeed based on joint and not just individual object behavior. Also, it is possible that the individual object behaviors are not anomalous when studied in isolation, but in combination produce an anomalous event. For example, a vehicle that comes to a stop at a pedestrian crossing before proceeding is a result of the car colliding with, or coming in very close proximity with the crossing pedestrian.

FIG. 3 illustrates a schematic view of trajectory classification utilizing a prior art sparse reconstruction model 100. In the example shown in FIG. 3, a first training class 120 is shown with respect to a second training class 140. A test trajectory 110 can be employed with respect to the training classes 120 and 140. Example data 130, 135 is shown in FIG. 3 with respect to the first training class 120.

Several approaches have been proposed to detect the traffic-related anomalies based on an object tracking technique. In one prior art approach such as shown in FIG. 3, nominal vehicle paths or trajectories can be derived and deviations thereof can be searched in a live traffic video data. The vehicle can be tracked and its path compared against nominal classes during a test or evaluation phase. A statistically significant deviation from all classes indicates an anomalous path.

Another approach involves the use of a sparse reconstruction model to solve the classification problem and subsequently for anomaly detection. For example, a normal and/or usual event in a video footage can be extracted and categorized into a set of nominal event classes in a training step. The categorization is based on a set of n-dimensional feature vectors extracted from the video data and can be performed manually or automatically. Any numerical feature descriptor can be used to encode the event. In transportation video, as mentioned earlier, object trajectories are often chosen as the feature descriptor. However, other descriptors such as spatiotemporal volume can also be used. The only hypothesis behind the sparsity model is that any new event that has been previously encountered in the training dictionary construction process can be explained as a sparse linear combination of samples within one of the nominal classes in the dictionary.

Specifically, the training samples from the i-th class of the dictionary can be arranged as columns of a matrix $A_i \in \mathbb{R}^{n \times T}$. A dictionary $A \in \mathbb{R}^{n \times KT}$ with respect to the training samples from all K classes can then be formed as follows: $A=[A_1, A_2, \ldots, A_K]$. A test image $y \in \mathbb{R}^n$ from a similar class is conjectured to approximately lie in a linear span of those training samples for given sufficient training samples from the m-th trajectory class. Any input trajectory feature vector may hence be represented by a sparse linear combination of the set of all training trajectory samples as shown below in equation (1):

$$y = A\alpha = [A_1, A_2, \ldots, A_K] \begin{bmatrix} \alpha_1 \\ \alpha_2 \\ \vdots \\ \alpha_K \end{bmatrix} \quad (1)$$

where each $\alpha_i \in \mathbb{R}^T$. Typically for a given trajectory y, only one of the $\alpha_i$'s is active (corresponding to the class/event that y is generated from), thus the coefficient vector $\alpha \in \mathbb{R}^{KT}$ is modeled as being sparse and is recovered by solving the following optimization problem:

$$\hat{\alpha} = \underset{\alpha}{\operatorname{argmin}} \|\alpha\|_1 \text{ subject to } \|y - A\alpha\|_2 < \varepsilon \quad (2)$$

where the objective is to minimize the number of non-zero elements in $\alpha$. It is well-known from the compressed sensing literature that utilizing the $l_0$ norm leads to a NP-hard (non-deterministic polynomial-time hard) problem. Thus, the $l_1$ norm can be employed as an effective approximation. A residual error between the test trajectory and each class behavior pattern can be computed as shown in equation (3) to determine a class to which the test trajectory belongs:

$$r_i(y) = \|y - A_i \hat{\alpha}_i\|_2, i=1,2,\ldots K \quad (3)$$

If anomalies have been predefined into their own class, then the classification task also accomplishes anomaly detection. Alternatively, if all training classes correspond to only normal events, then anomalies can be identified via outlier detection. To this end, an index of sparsity can be defined and utilized to measure the sparsity of the reconstructed α:

$$SCI(\alpha) = \frac{K \cdot \max_i \|\delta_i(\alpha)\|_i / \|\alpha\|_i - 1}{K - 1} \in [0, 1] \quad (4)$$

where $\delta_i(\alpha): \mathbb{R}^T \to \mathbb{R}^T$ the characteristic function that selects the coefficients $\alpha_i$ with respect to the i-th class. The normal samples are likely to exhibit a high level of sparsity, and conversely, anomalous samples likely produce a low sparsity index. A threshold on $SCI(\alpha)$ determines whether or not the sample is anomalous. Such a sparsity based framework for classification and anomaly detection is robust against various distortions, notably occlusion and is robust with respect to the particular features chosen, provided the sparse representation is computed correctly.

The aforementioned approach does not take into account joint anomalies involving multiple objects and also does not capture the interactions required to detect these types of multi-object anomalies. To address this issue, a joint sparsity model can be employed to detect anomalies involving co-occurrence of two or more events. The joint sparsity model solves for the sparse coefficients via the optimization problem. An example of the optimization problem and the joint sparsity model is discussed in U.S. patent application Ser. No. 13/476,239 entitled "Method and System for Automatically Detecting Multi-Object Anomalies Utilizing Joint Sparse Reconstruction Model," which is incorporated herein by reference in its entirety. The optimization problem can be expressed as, for example:

$$\text{minimize} \|J(H \circ S)\|_{row,0}$$

$$\text{subject to } \|Y - AS\|_F \leq \epsilon \quad (5)$$

The aforementioned sparsity models have been shown to outperform many prior art anomaly detection techniques. However, these models use only one predefined event representation. It is not difficult to see that utilizing multiple diverse event feature representations could contain correlated yet complementary information about the same event, whether normal or anomalous. For example, a vehicle traversing a traffic intersection may be observed from three cameras with very different viewpoints resulting in a triplet of motion trajectories describing that event. Alternatively, one may define multiple feature descriptors for an event, such as vehicle trajectory and spatiotemporal volume to obtain a richer description of events.

Based on the foregoing, it is believed that a need exists for improved methods and systems for automatically detecting multi-object anomalies at a traffic intersection utilizing a simultaneous structured sparsity model, as will be described in greater detailed herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods, systems, and processor-readable media for video anomaly detection.

It is another aspect of the disclosed embodiments to provide for improved methods, systems, and processor-readable media for automatically detecting multi-object anomalies at a traffic intersection utilizing a simultaneous structured sparsity model.

It is yet another aspect of the disclosed embodiments to provide for improved methods, systems, and processor-readable media for detecting anomalies among one or more moving objects in transportation related video footage.

The aforementioned aspects and other objectives and advantages can now be achieved as described herein. Methods and systems are disclosed for video anomaly detection based upon a sparsity model. A video input can be received. Then, two or more diverse descriptors of an event can be computed from the video input. The two or more descriptors can be combined to form an event matrix. A sparse reconstruction of the event matrix can be performed with respect to an over complete dictionary of training events represented by the two or more diverse descriptors. A step can then be performed to determine if the event is anomalous by computing an outlier rejection measure on the sparse reconstruction.

In some embodiments, steps or operations can be implemented for automatically detecting multi-object anomalies at a traffic intersection utilizing a simultaneous structured sparsity model. An event captured via a video surveillance application can be monitored and analyzed. The relative importance of difference descriptors among multiple diverse descriptors with respect to the event can be determined and designated utilizing the simultaneous structured sparsity model. A complementary benefit among the multiple diverse descriptors can be identified so as to enhance an anomaly detection with respect to the event by simultaneously utilizing the multiple diverse descriptors of the event and relative importance with respect to the simultaneous structured sparsity model.

The video input can be received and the multiple diverse descriptors with respect to the event can be computed from the video input. The multiple diverse descriptors can be combined to form an event matrix. A sparse reconstruction of the event matrix with respect to an over complete dictionary can be performed and an outlier rejection measure on the sparse reconstruction can be computed to determine if the event is anomalous.

A dynamic active set refers to the indexes of a set of coefficients associated with the same class in the coefficient matrix, which are jointly selected during sparse representation of multiple measurements. Each dynamic active set includes one index for each column of the coefficient matrix and the number of non-zero active sets can be minimized. The vector formed by collecting the coefficients associated with the dynamic active set can define a matrix norm. The dynamic active sets can be learned and updated during each iteration of the algorithm.

Each feature can be represented by selecting multiple diverse descriptors within the same sub-dictionary. The sparse representation vector have the same sparsity pattern at class level, but not necessarily at the atom level. Each of the sparse coefficient vectors may select different sparsity pattern at each iteration and the sparsity pattern can be constrained to be from the same sub-dictionary in order to further reduce the reconstruction error and still enforce sparsity. The simultaneous sparsity model yield more accurate anomaly detection where the complementary benefits of each individual event encoding are effectively exploited as diverse representations of the event are used. The column with respect to the event representation matrix can also be the same feature extractor (e.g., technique), but from multiple camera views. The simultaneous sparsity model effectively captures diversity in the event encoding to yield better performance.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
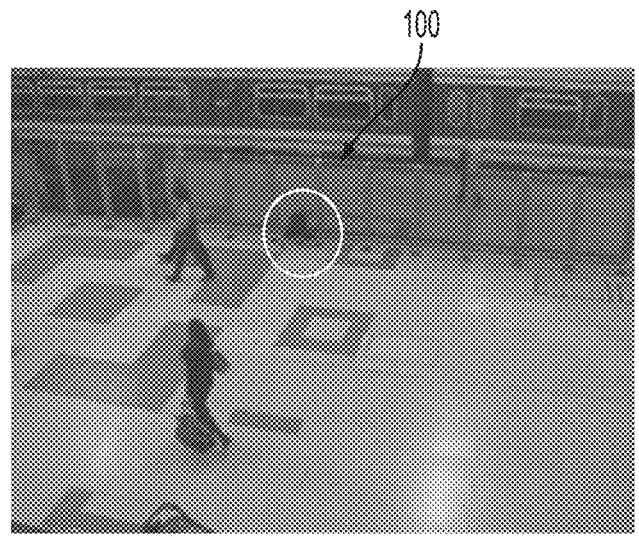
FIGS. 1-2 illustrate an exemplary view of transportation related anomalies.
Figure 2:
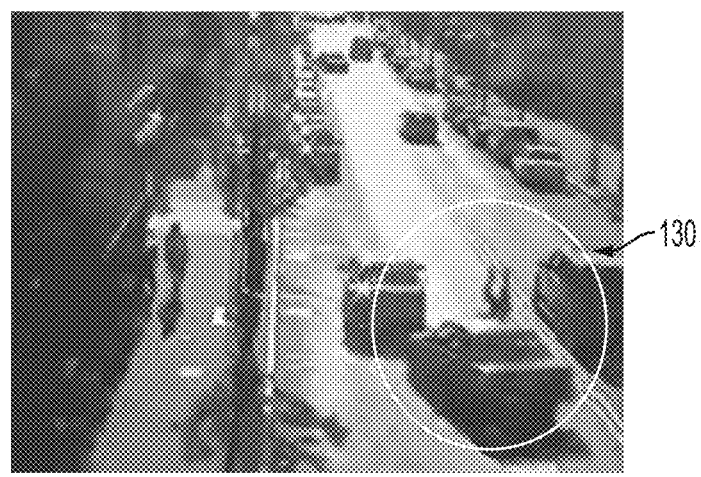
Figure 3:
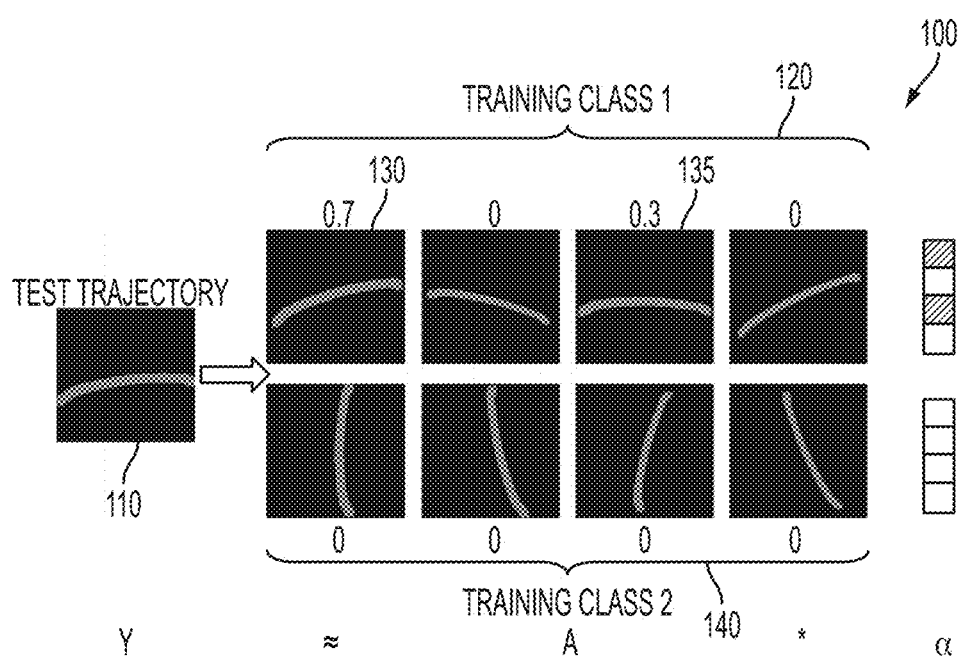
FIG. 3 illustrate a schematic view of trajectory classification utilizing a prior art sparse reconstruction model.
Figure 4:
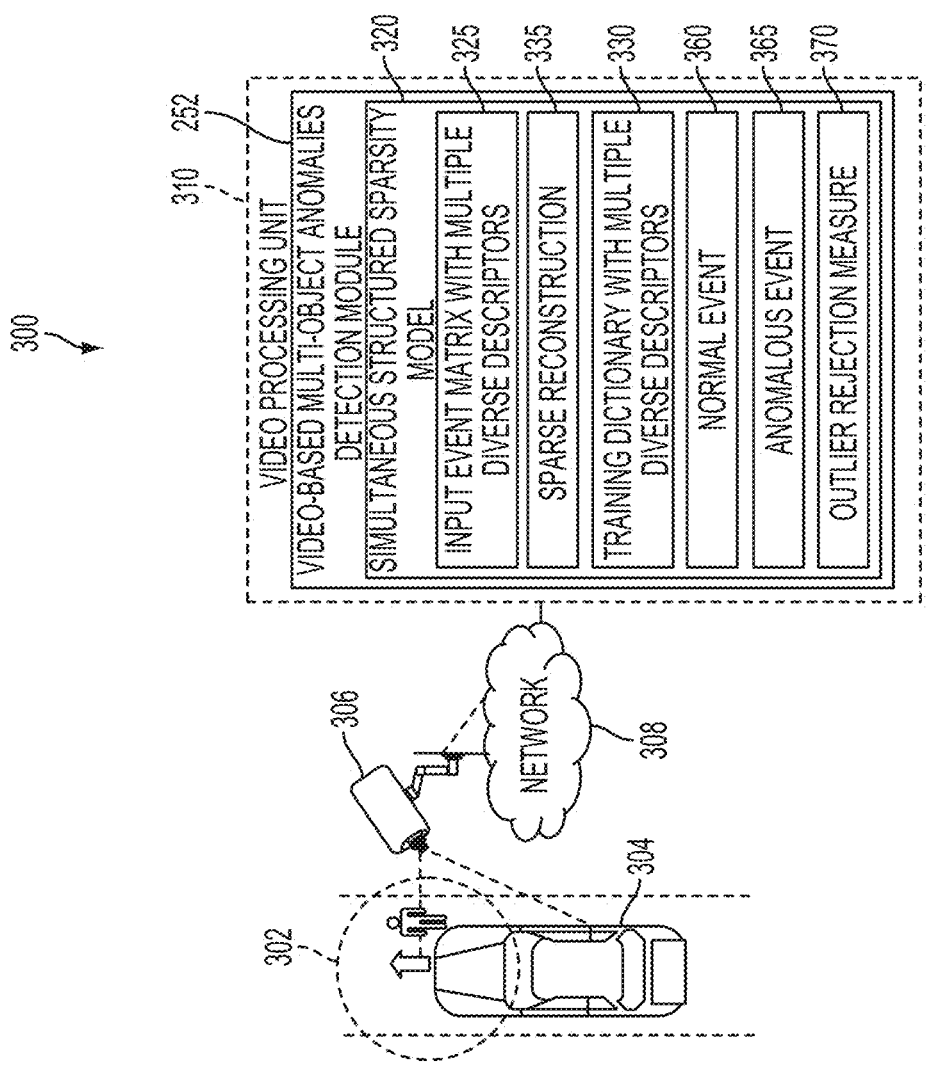
FIG. 4 illustrates a block diagram of a video anomaly detection system based on a simultaneous structured sparsity modeling, in accordance with the disclosed embodiments.

FIG. 4 illustrates a block diagram of a video anomaly detection system 300 based on a simultaneous structured sparsity model 320, in accordance with the disclosed embodiments. The video anomaly detection system 300 detects anomalies or abnormal patterns 302 from a video footage to identify unsafe driver/pedestrian behavior, accidents, traffic violations, suspicious activity, etc. The video anomaly detection system 300 detects abnormal patterns 302 in scenarios where there are multiple vehicles potentially moving along complex trajectories, and in the presence of clutter and other background noise.

The video anomaly detection system 300 generally includes an image capturing unit 306 (e.g., camera) for capturing an image of a vehicle 304 in motion within an effective field of view. The image capturing unit 306 can be operatively connected to a video processing unit 310 via a network 308. Note that the image capturing unit 306 described in greater detail herein is analogous or similar to the image capturing unit 208 of the data-processing system 200 depicted in FIG. 9. The image-capturing unit 306 may include built-in integrated functions such as, for example, image processing, data formatting, and data compression functions.

Note that the network 308 may employ any network topology, transmission medium, or network protocol. The network 308 may include connections such as wire, wireless communication links, or fiber optic cables. Network 308 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The video anomaly detection system 300 includes a video anomaly detection module 252 for detecting the anomalies in transportation video footage. The video anomaly detection module 252 can be configured to include a simultaneous structured sparsity model 320 that determines and designates a relative importance of difference descriptors among, for example, multiple diverse descriptors with respect to the event 302. The model 320 can include, for example, an input event matrix 325 with multiple diverse descriptors. The model 320 can also include a sparse reconstruction 335 and a training dictionary 330 with multiple diverse descriptors. Additionally, the model 320 can include a normal event 360 and an anomalous event 364.

The simultaneous structured sparsity model 320 identifies a complementary benefit among the multiple diverse descriptors so as to enhance anomaly detection with respect to the event 302 by simultaneously utilizing such multiple diverse descriptors of the event 302 and relative importance with respect to the sparsity model 320.

The video anomaly detection module 252 receives the video input from the image capturing unit 306 and computes the multiple diverse descriptors with respect to the event 302 from the video input. The multiple diverse descriptors can be combined to form the input event matrix 325. The simultaneous structured sparsity model 320 performs a sparse reconstruction 335 of the input event matrix 325 with respect to the training dictionary 330 and computes an outlier rejection measure 370 on the sparse reconstruction 335 to determine if the event 302 is anomalous.

An event belonging to a given class within the dictionary can be represented by selecting multiple diverse descriptors (e.g., different sets of atoms). For example, corresponding to M distinct descriptors, there may correspondingly be a coefficient matrix of M columns. Each of the sparse coefficient vectors (e.g., a column of the sparse coefficient matrix) may select different sparsity pattern at each iteration and the sparsity pattern can be constrained to be from the same class-specific sub-dictionary in order to further reduce the reconstruction error and still enforce sparsity.

Figure 5:
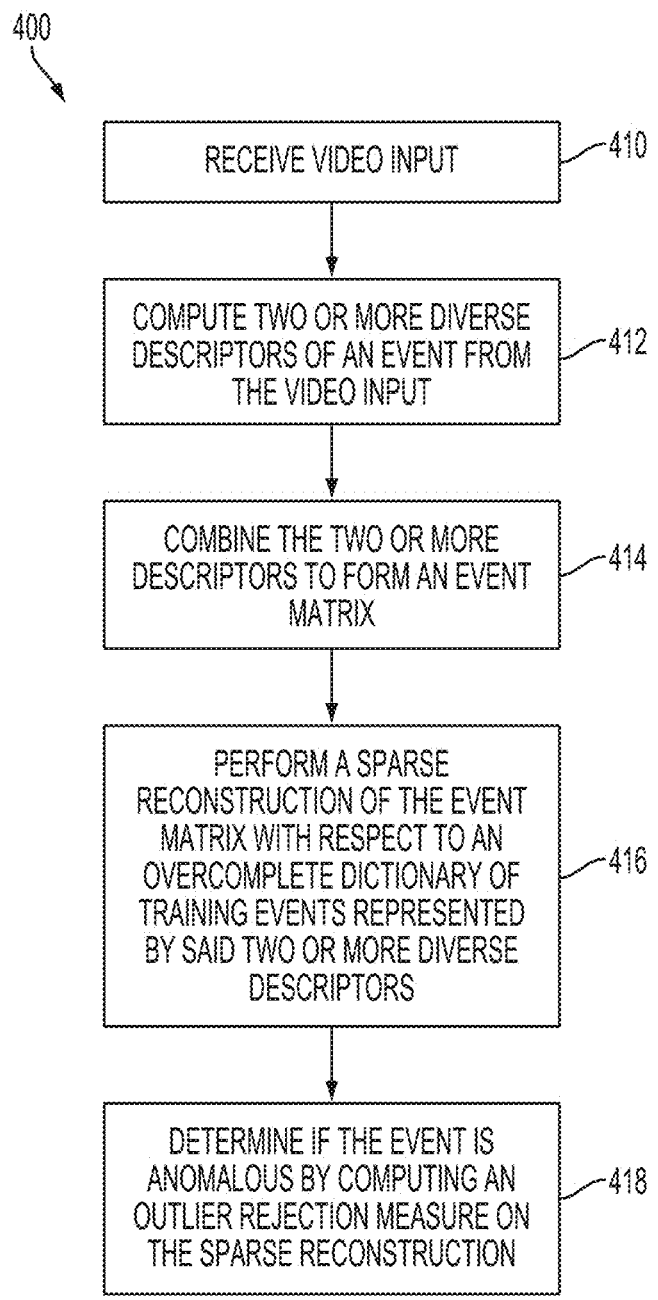
FIG. 5 illustrates a high level flow chart of operations illustrating logical operational steps of a method for detecting multi-object anomalies utilizing the simultaneous structured sparsity model, in accordance with the disclosed embodiments.

FIG. 5 illustrates a high level flow chart of operations illustrating logical operational steps of a method 400 for video anomaly detection utilizing a sparsity model, in accordance with the disclosed embodiments. It can be appreciated that the logical operational steps shown in FIG. 5 can be implemented or provided via, for example, a module such as module 252 shown in FIG. 10 and can be processed via a processor, such as, for example, the processor 201 shown in FIG. 9.

As shown at block 410, a step or logical operation can be implemented for receiving a video input. Then, as indicated at block 412, a step or logical operation can be implemented for computing two or more diverse descriptors of an event from the video input. Thereafter, as shown at block 414, a step or logical operation can be provided for combining the two or more descriptors to form an event matrix. Next, as shown at block 416, a step or logical operation can be provided for performing a sparse reconstruction of the event matrix with respect to an over complete dictionary of training events represented by the two or more diverse descriptors. Then, as illustrated at block 418, a step or logical operation can be performed for determining if the event is anomalous by computing an outlier rejection measure on the sparse reconstruction.

Images of the event 302 can be captured via the image-capturing unit 306 and monitored and analyzed. The video input can be received and the multiple diverse descriptors with respect to the event 302 can be computed from the video input. The multiple diverse descriptors can be combined to form the event matrix such as, for example, the input event matrix 325.

The relative importance of difference descriptors among the multiple diverse descriptors with respect to the event can be determined and designated utilizing the sparsity model. In some embodiments, the sparse reconstruction of the event matrix with respect to a training dictionary can be performed and an outlier rejection measure on the sparse reconstruction can be computed to determine if the event is anomalous. Complementary benefits among the multiple diverse descriptors can be identified so as to enhance anomaly detection with respect to the event by simultaneously utilizing the multiple diverse descriptors of the event and relative importance with respect to the sparsity model 320.

Figure 7:
FIG. 7 illustrates a video footage of a driver as he/she backs his/her vehicle in front of a stop sign, in accordance with the disclosed embodiments.

A dynamic active set gq $R^M$ refers to the indexes of a set of coefficients associated with the same class in the coefficient matrix X, which are jointly selected during sparse representation of multiple measurements. Each dynamic active set gq contains one and only one index for each column of X, where gq (j) indexes the selected coefficient for the j-th column of X, as shown in FIG. 7

Instead of minimizing number of non-zero rows, the number of non-zero active sets can be minimized. The matrix norm can be defined as shown below in equation (6):

$$|X|_G = |[|x_{g1}|_2/2, |x_{g2}|_2, \ldots, |x_{gQ}|_2]|_0 \qquad (6)$$

where xgq denotes the vector formed by collecting the coefficients associated with the q-th dynamic active set gq. The optimization problem can be represented as depicted in equation (7):

$$\text{minimize} |X|_G$$

$$\text{subject to } |Y - AX|_F \le E \qquad (7)$$

The dynamic active sets gq can be learned and updated during each iteration of the algorithm. In the case where there are no labelled anomalous events in the training set, anomaly detection is performed by utilizing an outlier rejection measure. Essentially, the outlier rejection measures checks to determine if the active sparse coefficients in the matrix X are grouped together in a particular normal class or distributed across classes. In the latter scenario, an outlier is declared and the event is labeled anomalous.

Datasets used for the experiments may include, for example, a stop sign data set and a public data set for traffic video (PDTV). In such an example scenario, the stop sign data set can include trajectories of the vehicle 620 driving through the stop sign 610. For the stop sign data set example, the training dictionary may contain 9 normal event classes (e.g., containing 8 trajectories each) and 1 anomalous trajectory class (e.g., containing 4 trajectories). An independent set of 34 normal trajectories and 8 anomalous trajectories were employed to test the disclosed embodiment.

Figure 6:
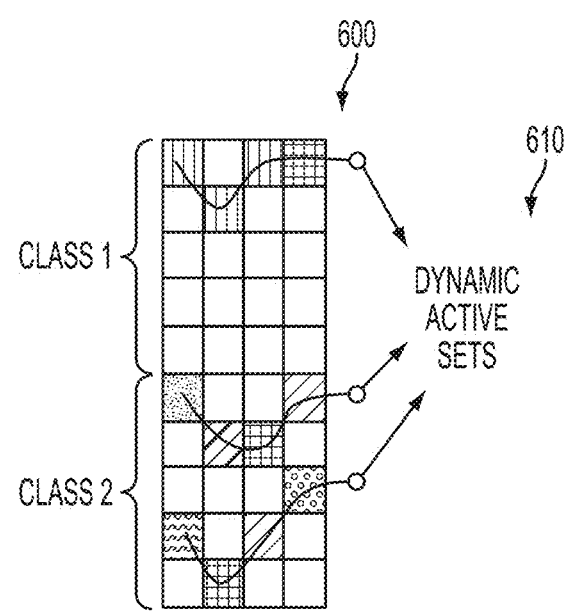
FIG. 6 illustrates a schematic view of sparse coefficient vectors that select different atoms within each sub-dictionary, in accordance with the disclosed embodiments.
Figure 8:
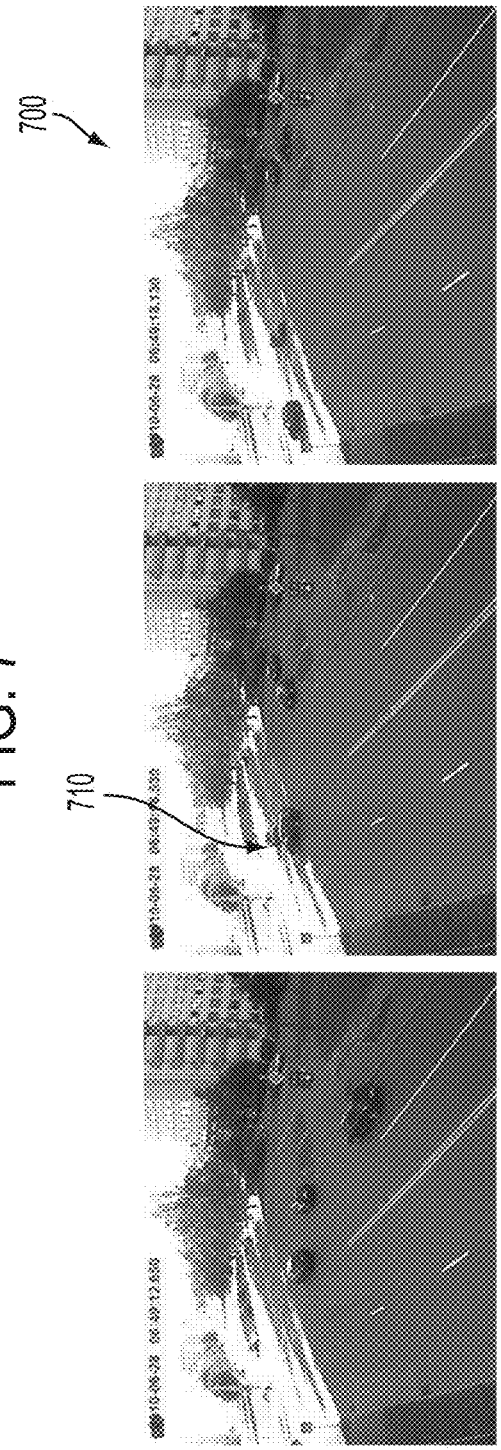
FIG. 8 illustrates a video footage of a vehicle that fails to yield to an oncoming vehicle while turning left, in accordance with the disclosed embodiments.

FIG. 6 illustrates a frame 600 from example video footage of an anomalous event from the stop sign dataset, in accordance with an embodiment. In FIG. 6, dynamic active sets are shown with respect to Class 1 and Class 2. FIG. 7 illustrates example video footage 601 of a driver 620 backing his or her vehicle in front of a stop sign, in accordance with the disclosed embodiments. FIG. 8 illustrates a video footage 700 of a vehicle failing to yield to oncoming vehicle while turning left, in accordance with the disclosed embodiments.

In the example scenario of video footage 601 shown in FIG. 7, a driver unexpectedly backs up the vehicle 620 in front of a stop sign 610, in accordance with the disclosed embodiments. An example from the second dataset, PDTV, can be seen in FIG. 8, whereby a vehicle fails to yield to oncoming vehicle while turning left, as indicated by arrow 710. For the experiment involving the PDTV data set, a training dictionary consisting of, for example, 319 normal event trajectories and 64 anomalous trajectories were obtained. 117 normal trajectories and 24 anomalous trajectories were employed as independent test data. It can be appreciated that such values are not considered limiting features of the disclosed embodiments, but are provided for illustrative purposes only.

The different sets of features can be employed to test the disclosed embodiments. Trajectory features and velocity features can be first employed into the simultaneous structured sparsity model. Then, the trajectory features plus spatiotemporal volume (STV) features can be employed. Both results can be compared against the prior art sparsity-based single-perspective anomaly detection method using only trajectory features.

TABLE I

| | Sparsity model | | Trajectory + Velocity | | Trajectory + STV | |
|---|---|---|---|---|---|---|
| | Normal | Anomaly | Normal | Anomaly | Normal | Anomaly |
| Normal | 91.2% | 25.0% | 94.1% | 25.0% | 94.1% | 12.5% |
| Anomaly | 8.8% | 75.0% | 5.9% | 75.0% | 5.9% | 87.5% |

Table I shows the confusion matrices utilizing trajectory plus velocity features and trajectory plus STV features. The benefits of using multiple features in the form of improved detection rates of the disclosed embodiments over the prior art approach is shown in Table. 1. The trajectory plus STV performs better than trajectory plus velocity because STV features capture more information for anomaly detection than velocity features.

The confusion matrices for the PDTV data set are shown in Table II, which is similar to Table I:

TABLE II

| | Sparsity model | | Trajectory + Velocity | | Trajectory + STV | |
|---|---|---|---|---|---|---|
| | Normal | Anomaly | Normal | Anomaly | Normal | Anomaly |
| Normal | 80.3% | 37.5% | 84.6% | 33.3% | 86.3% | 29.2% |
| Anomaly | 19.7% | 62.5% | 15.4% | 68.7% | 13.7% | 70.8% |

The simultaneous sparsity model yield more accurate anomaly detection where the complementary benefits of each individual event encoding are effectively exploited as diverse representations of the event are used. The column with respect to the event representation matrix can also be the same feature extractor (e.g., technique), but from multiple camera views. The simultaneous sparsity model effectively captures diversity in event encoding to yield better performance.

As will be appreciated by one skilled in the art, embodiments can be implemented in the context of a method, data processing system, or computer program product. Accordingly, some embodiments may take the form of an entire hardware embodiment, an entire software embodiment or an embodiment combining software and hardware aspects all generally referred to herein as a "circuit" or "module." Furthermore, embodiments may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions or acts specified in the block or blocks such as, for example, blocks 410, 412, 414, 416, 418 shown in FIG. 5.

Figure 9:
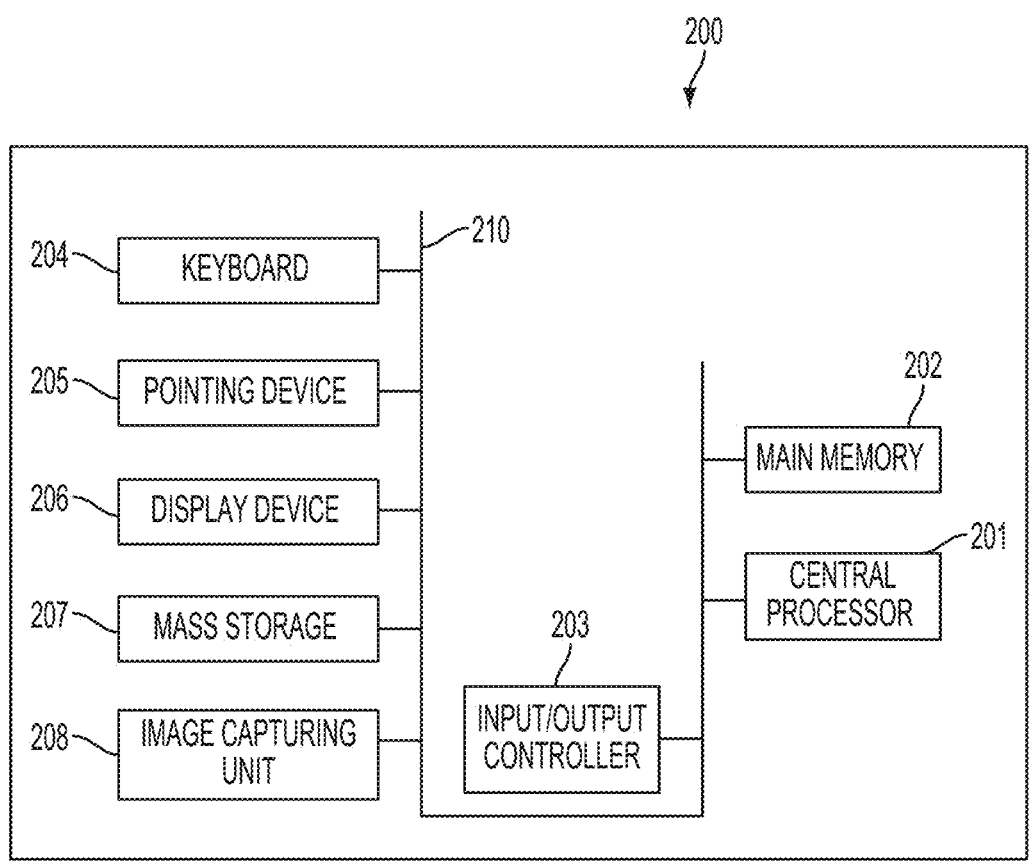
FIG. 9 illustrates a schematic view of a computer system, in accordance with the disclosed embodiments.
Figure 10:
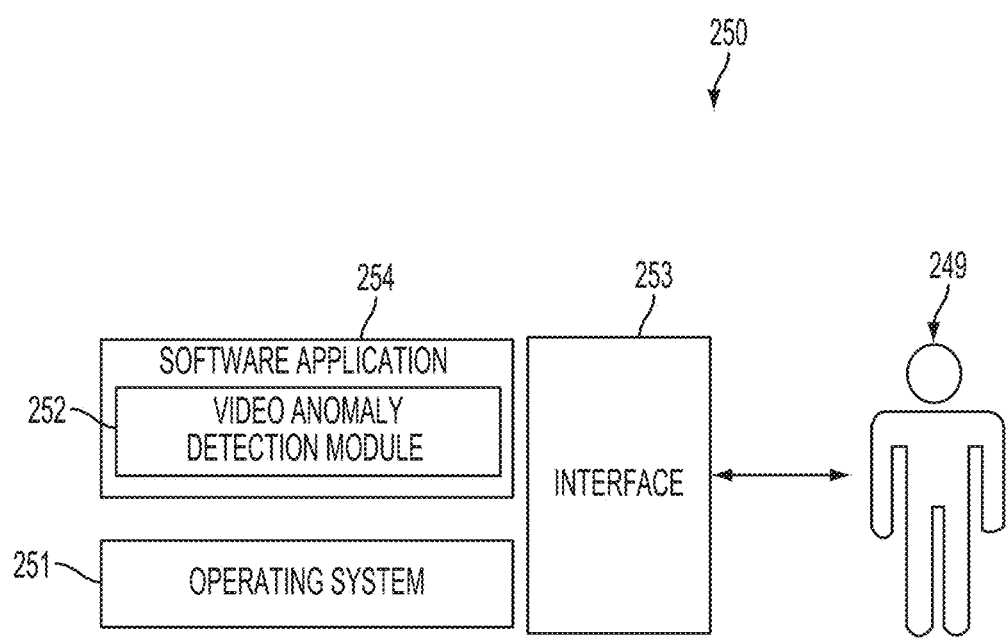
FIG. 10 illustrates a schematic view of a software system including a video anomaly detection module, an operating system, and a user interface, in accordance with the disclosed embodiments.

FIGS. 9-10 are provided as exemplary diagrams of data-processing environments in which embodiments of the present invention may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, and pen device, etc.), a display device 206, a mass storage 207 (e.g., a hard disk), an image capturing unit 208 and a USB (Universal Serial Bus) peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 10 illustrates a computer software system 250 for directing the operation of the data-processing system 200 depicted in FIG. 9. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 251 and/or software application 254.

Note that the discussion herein is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon the user may supply additional inputs or terminate the session. In an embodiment, operating system 251 and interface 253 can be implemented in the context of a "Windows" system. It can be appreciated, of course, that other types of systems are possible. For example, rather than a traditional "Windows" system, other operation systems, such as, for example, Linux may also be employed with respect to operating system 251 and interface 253. The software application 254 can include a video anomaly detection module 252 for detecting anomalies in transportation video footage based on a simultaneous structured sparsity model. Software application 254, on the other hand, can include instructions, such as the various operations described herein with respect to the various components and modules described herein, such as, for example, the method 400 depicted in FIG. 5.

FIGS. 9-10 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. For example, in one embodiment, a method for video anomaly detection based upon a sparsity model can be implemented. Such a method can include the steps or logical operations of, for example, computing at least two descriptors of an event from video; combining the at least two descriptors to form an event matrix with respect to the event; performing a sparse reconstruction of the event matrix with respect to an over complete dictionary of training events represented by the at least two descriptors; and determining if the event is anomalous based on an analysis of the sparse reconstruction.

In another embodiment, a step or logical operation can be provided for receiving the video. In yet another embodiment, the aforementioned event can include at least one moving object, a first descriptor among the at least two descriptors that is derived from object trajectories, and a second descriptor among the at least two descriptors that is derived from a spatiotemporal volume.

In another embodiment, the step or logical operation of performing the sparse reconstruction can further include the steps or logical operations of defining the sparse reconstruction as: $Y=AX$ wherein Y represents the event matrix, A represents the over complete dictionary of training events, and X represents a sparse reconstruction matrix; defining within X a dynamic active set to be indices of a set of all non-zero coefficients associated with a single normal event class, which are simultaneously activated during a sparse representation with multiple event descriptors; and minimizing a number of dynamic active sets in X subject to a constraint that $\|Y-AX\|_F \leq \epsilon$ wherein $\| \|_F$ denotes a Frobenius norm, and $\epsilon$ represents a predetermined threshold.

In another embodiment, minimizing of the number of dynamic active sets in X can be accomplished by processing an iterative greedy matching pursuit algorithm. In yet another embodiment, determining if the event is anomalous can involve computing an outlier rejection measure with respect to the sparse reconstruction. In a preferred embodiment, the aforementioned video can be captured from one or more cameras.

In another embodiment, a system for video anomaly detection based upon a sparsity model can be implemented. Such a system can include, for example, a processor; and a computer-usable medium embodying computer program code, the computer-usable medium capable of communicating with the processor. The computer program code can include instructions executable by the processor and configured for: computing at least two descriptors of an event from video; combining the at least two descriptors to form an event matrix with respect to the event; performing a sparse reconstruction of the event matrix with respect to an over complete dictionary of training events represented by the at least two descriptors; and determining if the event is anomalous based on an analysis of the sparse reconstruction. The processor can communicate with, for example, one or more cameras that capture the aforementioned video.

In another embodiment, a processor-readable medium storing computer code representing instructions to cause a process for video anomaly detection based upon a sparsity model can be implemented. Such computer code can include code to: compute at least two descriptors of an event from video captured from at least one camera; combine the at least two descriptors to form an event matrix with respect to the event; perform a sparse reconstruction of the event matrix with respect to an over complete dictionary of training events represented by the at least two descriptors; and determine if the event is anomalous based on an analysis of the sparse reconstruction.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for video anomaly detection based upon a sparsity model, said method comprising:
    computing at least two descriptors of an event from video acquired by at least one camera;
    combining said at least two descriptors to form an event matrix with respect to said event;
    performing a sparse reconstruction of said event matrix with respect to an over complete dictionary of training events represented by said at least two descriptors, said sparse reconstruction based on a simultaneous structured sparsity model; and
    determining if said event is anomalous based on an analysis of said sparse reconstruction by computing an outlier rejection measure with respect to said sparse reconstruction and utilizing said outlier rejection measure to determine if said event is anomalous.

2. The method of claim 1 wherein said over complete dictionary comprises a training dictionary including normal event trajectories and anomalous trajectories.

3. The method of claim 1 wherein said event comprises at least one moving object, a first descriptor among said at least two descriptors is derived from object trajectories, and a second descriptor among said at least two descriptors is derived from a spatiotemporal volume.

4. The method of claim 3 wherein performing said sparse reconstruction further comprises:
    defining said sparse reconstruction as: Y=AX wherein Y represents said event matrix, A represents said over complete dictionary of training events, and X represents a sparse reconstruction matrix;
    defining within X a dynamic active set to be indices of a set of all non-zero coefficients associated with a single normal event class, which are simultaneously activated during a sparse representation with multiple event descriptors; and
    minimizing a number of dynamic active sets in X subject to a constraint that $\|Y-AX\|_F \leq \epsilon$ wherein $\| \|_F$ denotes a Frobenius norm, and $\epsilon$ represents a predetermined threshold.

5. The method of claim 4 wherein said minimizing of said number of dynamic active sets in X is accomplished by processing an iterative greedy matching pursuit algorithm.

6. The method of claim 5 wherein said outlier rejection measure checks to determine if active sparse coefficients in X are grouped together in a particular normal class or distributed across classes with respect to said sparse reconstruction.

7. The method of claim 1 wherein an event belonging to a given class with said over complete dictionary is representing by selecting multiple diverse descriptors among said at least two descriptors.

8. A system for video anomaly detection based upon a sparsity model, said system comprising:
    a processor; and
    a computer-usable medium embodying computer program code, said computer-usable medium capable of communicating with said processor, said computer program code comprising instructions executable by said processor and configured for:
        computing at least two descriptors of an event from video acquired by at least one camera;
        combining said at least two descriptors to form an event matrix with respect to said event;
        performing a sparse reconstruction of said event matrix with respect to an over complete dictionary of training events represented by said at least two descriptors, said sparse reconstruction based on a simultaneous structured sparsity model; and
        determining if said event is anomalous based on an analysis of said sparse reconstruction by computing an outlier rejection measure with respect to said sparse reconstruction and utilizing said outlier rejection measure to determine if said event is anomalous.

9. The system of claim 8 wherein said over complete dictionary comprises a training dictionary including normal event trajectories and anomalous trajectories.

10. The system of claim 8 wherein said event comprises at least one moving object, a first descriptor among said at least two descriptors is derived from object trajectories, and a second descriptor among said at least two descriptors is derived from a spatiotemporal volume.

11. The system of claim 10 wherein said instructions for performing said sparse reconstruction are further configured for:
    defining said sparse reconstruction as: Y=AX wherein Y represents said event matrix, A represents said over complete dictionary of training events, and X represents a sparse reconstruction matrix;
    defining within X a dynamic active set to be indices of a set of all non-zero coefficients associated with a single normal event class, which are simultaneously activated during a sparse representation with multiple event descriptors; and
    minimizing a number of dynamic active sets in X subject to a constraint that $\|Y-AX\|_F \leq \epsilon$ wherein $\| \|_F$ denotes a Frobenius norm, and $\epsilon$ represents a predetermined threshold.

12. The system of claim 11 wherein said minimizing of said number of dynamic active sets in X is accomplished by processing an iterative greedy matching pursuit algorithm.

13. The system of claim 12 wherein said outlier rejection measure checks to determine if active sparse coefficients in X are grouped together in a particular normal class or distributed across classes with respect to said sparse reconstruction.

14. The system of claim 8 further comprising at least one camera for capturing said video, wherein said at least one camera communicates with said processor and said memory and wherein an event belonging to a given class with said over complete dictionary is representing by selecting multiple diverse descriptors among said at least two descriptors.

15. A non-transitory processor-readable medium storing computer code representing instructions to cause a process for video anomaly detection based upon a sparsity model, said computer code further comprising code to:
    compute at least two descriptors of an event from video acquired by at least one camera;
    combine said at least two descriptors to form an event matrix with respect to said event;
    perform a sparse reconstruction of said event matrix with respect to an over complete dictionary of training events represented by said at least two descriptors, said sparse reconstruction based on a simultaneous structured sparsity model; and determine if said event is anomalous based on an analysis of said sparse reconstruction by computing an outlier rejection measure with respect to said sparse reconstruction and utilizing said outlier rejection measure to determine if said event is anomalous.

16. The processor-readable medium of claim 15 wherein said over complete dictionary comprises a training dictionary including normal event trajectories and anomalous trajectories.

17. The processor-readable medium of claim 15 wherein said event comprises at least one moving object, a first descriptor among said at least two descriptors is derived from object trajectories, and a second descriptor among said at least two descriptors is derived from a spatiotemporal volume.

18. The processor-readable medium of claim 17 said computer code to performing said sparse reconstruction further comprises code to:
define said sparse reconstruction as: Y=AX wherein Y represents said event matrix, A represents said over complete dictionary of training events, and X represents a sparse reconstruction matrix;
define within X a dynamic active set to be indices of a set of all non-zero coefficients associated with a single normal event class, which are simultaneously activated during a sparse representation with multiple event descriptors; and
minimize a number of dynamic active sets in X subject to a constraint that $\|Y-AX\|_F \leq \epsilon$ wherein $\| \|_F$ denotes a Frobenius norm, and $\epsilon$ represents a predetermined threshold.

19. The processor-readable medium of claim 18 wherein said minimizing of said number of dynamic active sets in X is accomplished by processing an iterative greedy matching pursuit algorithm.

20. The processor-readable medium of claim 15 wherein said outlier rejection measure checks to determine if active sparse coefficients in X are grouped together in a particular normal class or distributed across classes with respect to said sparse reconstruction.

* * * * *